United States Patent [19]
Cook

[11] Patent Number: 4,987,696
[45] Date of Patent: Jan. 29, 1991

[54] FISH HOOK CONSTRUCTION

[76] Inventor: Russell P. Cook, 22 Pinewood Rd., Wellesley, Mass. 02181

[21] Appl. No.: 441,638

[22] Filed: Nov. 27, 1989

[51] Int. Cl.5 ............................................. A01K 83/00
[52] U.S. Cl. ................................................... 43/43.16
[58] Field of Search ...................................... 43/43.16

[56] References Cited

U.S. PATENT DOCUMENTS

| | | | |
|---|---|---|---|
| 699,397 | 5/1902 | Lacey | 43/43.16 |
| 1,513,400 | 10/1924 | Koski | 43/43.16 |
| 1,741,034 | 12/1929 | Newton | 43/43.16 |
| 3,101,565 | 8/1963 | Hoda | 43/43.16 |
| 3,564,749 | 2/1971 | Shigekatsu | 43/43.16 |
| 4,667,435 | 5/1987 | Fujimoto | 43/43.16 |

FOREIGN PATENT DOCUMENTS 2067882  8/1981  United Kingdom ............... 43/43.16

Primary Examiner—Kurt Rowan
Attorney, Agent, or Firm—Paul J. Cook

[57] ABSTRACT

A fish hook construction is provided which includes a wing secured to the hook shank at an angle between 30 to 60 degrees from the hook shank in a direction toward the hook elbow as well as being positioned perpendicular to the plane defined by the shank and hook elbow.

2 Claims, 1 Drawing Sheet

FISH HOOK CONSTRUCTION

BACKGROUND OF THE INVENTION

This invention relates to a fish hook construction adapted to increase the probability of implanting the hook into a fish and decreases the probability of swallowing the hook by a fish during use by an angler.

Prior to this invention, it has been proposed in U.S. Pat. No. 699,397 to provide a fish hook with a vane or a wing which extends in a direction from the hook shark directly opposite to the direction of extension of the hook. By utilizing such a wing or vane, when the line attached to the hook is pulled, the hook will move upwardly toward the direction of pull. This upward move is caused by the drag imposed by the wing or vane which functions as a fulcrum to provide the upward hook movement. If the hook is positioned so that the hook extends away from the fish, the sudden pulling and upward movement of the hook will cause the hook to move away from the fish thereby rendering the hook useless. Accordingly, it would be be desirable to provide a fish hook which improves the probability of implanting the barbed point portion of the hook into the mouth of the fish during use by an angler.

SUMMARY OF THE INVENTION

This invention provides a fish hook construction which utilizes a wing or vane attached to a conventional hook positioned in a manner which promotes implanting the barbed point portion of the hook into the mouth of a fish during use by an angler. The wing is positioned at an angle between 30 to 60 degrees from the hook shank in a direction toward the hook elbow as well as being positioned perpendicular to the plane defined by the shank and hook elbow. The probability of the hook being implanted into the mouth of the fish is substantially increased when the line attached to the hook is pulled by the angler.

DESCRIPTION OF SPECIFIC EMBODIMENTS

In accordance with this invention, a hook construction is provided comprising a hook shank, a hook barb attached to the hook shank, a wing attached to the hook shank and means for attaching the hook to a flexible line. The wing is positioned at an angle between 30 to 60 degrees from the hook shank in a direction toward the hook elbow as well as being positioned perpendicular to the plane defined by the shank and hook elbow. One or more wings each positioned in the same manner can be attached to the shank.

In use, when the line attached to the hook is pulled by the angler, the wing provides hydrodynamic lift so that the hook barb is lifted in a direction the same as the direction of the wing path. Since the wing is positioned at an angle between about 30° and 60° from the axis defined above, the hook is lifted in a direction toward the mouth of the fish. In any event, the hook is not lifted in a direction toward the fish mouth opening. Thus, the fish hook of this invention provides greatly improved probability of being implanted into the mouth of the fish.

Figure 1:
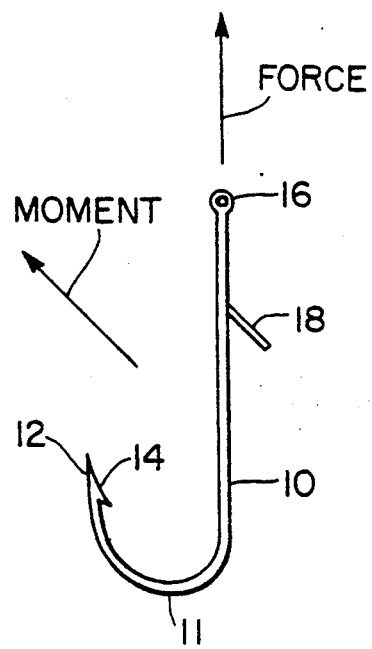
FIG. 1 is a side view of a hook construction of this invention.

Referring to FIG. 1, the fish hook construction of this invention comprises a fish shank 10, an elbow 11, a hook 12 and a hook barb 14 of unitary construction. A loop 16 is attached to shank 10 in order to provide a means for attaching a line to the hook construction. A wing 18 is attached to the hook shank 10 such as by being formed of unitary construction or by being attached thereto by a sleeve or the like. The wing 18 extends in a direction between 30 to 60 degrees from the hook shank in a direction toward the hook elbows as well as being positioned perpendicular to the plane defined by the shank and hook elbow. from an axis defined by hook 12 and the cross section of shank 10. As shown in FIG. 1, the barb 14 extends from the hook 12 toward shank 10.

Figure 2:
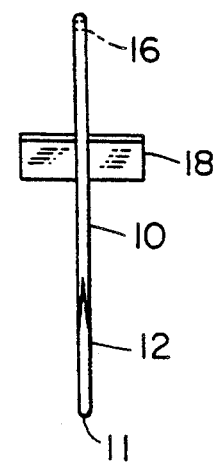
FIG. 2 is a front view of the hook of FIG. 1.
Figure 3:
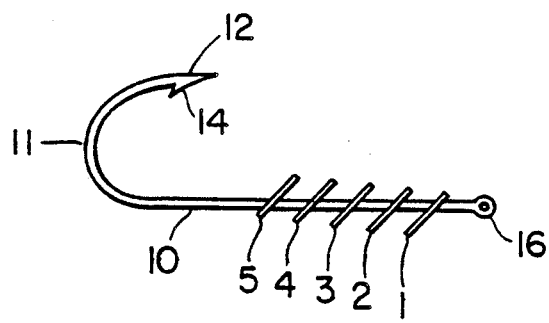
FIG. 3 is a side view of the hook of this invention having multiple wings.

An alternative embodiment is shown in FIG. 3 wherein reference numerals as in FIGS. 1 and 2 refer to the same fish hook construction elements. As shown in FIG. 3, a plurality of wings 1, 2, 3, 4 and 5 each positioned in the manner described above. The wings are offset from each other so that the wing 5 is closest to hook 12 and wing 1 is further away from the hook 12. This arrangement of a plurality of wings (two or more) provides an anticavitation effect.

The surface design of the wing 18 is not critical to the present invention so long as it provides hydrodynamic drag when a line attached to the loop 16 is pulled. Thus, the wing 18 can have a circular plan view, elliptical cross-section, triangular cross-section or the like and can be provided with small holes if desired. Also, the present invention contemplates one or a plurality of hooks attached to one or a plurality of hook shanks, each of which are attached to a common wing, if desired.

Claims:

1. A fish hook construction which comprises a hook shank, a hook barb attached to said shank and defining one end of said construction, a wing having a first portion rigidly secured to said shank positioned between 30 to 60 degrees from e hook shank in a direction toward a hook elbow and the plane of the wing being perpendicular to the plane defined by the shank and hook elbow, said wing having a free unsecured end and means for attaching a line to said construction.

2. The construction of claim 1 wherein a plurality of wings are positioned on said shank in the direction of claim 1.

* * * * *